United States Patent Office 3,799,782
Patented Mar. 26, 1974

3,799,782
SYNTHETIC SILVER HALIDE EMULSION BINDER
Maurice J. Fitzgerald, Canton, Mass., assignor to Polaroid Corporation, Cambridge, Mass.
No Drawing. Filed Dec. 14, 1972, Ser. No. 315,089
Int. Cl. G03c *1/04*
U.S. Cl. 96—113                                     21 Claims

ABSTRACT OF THE DISCLOSURE

A photosensitive silver halide emulsion wherein the emulsion binder comprises a graft copolymer of a vinyl aminoalkyl ether monomer on a polyhydroxy-substituted polymer.

BACKGROUND OF THE INVENTION

This invention relates to photography and more particularly, to novel photosensitive photographic elements, particularly novel photosensitive emulsions.

As a result of the known disadvantages of gelatin, in particular, its variable photographic properties and its fixed physical properties, for example, its diffusion characteristics; much effort has been expended in the past in order to replace gelatin with a suitable synthetic colloid binder for photographic silver halide emulsions. Many synthetic polymeric materials have heretofore been suggested as peptizers for silver halide emulsions; however, these have generally not functioned satisfactorily and frequently have not fulfilled all of the basic requirements for a photosensitive silver halide emulsion binder listed following:

(1) Absent (or constant) photographic activity;
(2) Ability to form an adsorption layer on microcrystals of silver halide permitting stable suspensions to be obtained;
(3) Ability to form adsorption layers as described in (2) above which do not prevent growth of silver halide microcrystals during physical ripening; and
(4) Solubility in water solution.

In addition, hithertofore, much emphasis has been placed on the ability of the synthetic polymeric material to mix with gelatin, as this property has been critical for employment in partial substitution reactions with gelatin. Consequently, many synthetic polymers of the prior art have been materials which allow for the growth of silver halide crystals only in the presence of gelatin.

Although Perry and Reynolds, U.S. Pat. No. 3,425,836 describes polymers suitable as peptizers for silver halide dispersions in the preparation of photographic emulsions wherein repeating units of a hydrophilic polysaccharide contain quaternary nitrogen substituents bonded to the polymer through ether linkages, it has hithertofore been unknown to employ a graft copolymer of the corresponding vinyl aminoalkyl ether monomer on a polymer containing a plurality of hydroxyl groups for this purpose. Those skilled in the chemical arts are well aware of the substantial differences that exist in the chemical behavior of N-substituted amine derivatives when compared with their quaternized analogs and therefore it was quite unexpected to find that the vinyl aminoalkyl ether graft copolymers of the present invention could also be employed to replace gelatin, either partly or entirely, in photographic silver halide emulsions.

SUMMARY OF THE INVENTION

The present invention is directed to a photosensitive silver halide emulsion wherein the silver halide crystals are disposed in a water-soluble film-forming synthetic polymeric binder comprising a graft copolymer of a vinyl aminoalkyl ether monomer represented by the formula:

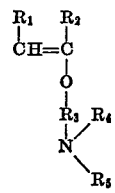

wherein $R_1$ is hydrogen, a lower alkyl group, i.e., 1–4 carbon alkyl group, preferably methyl or ethyl, or a halogen, i.e., chloro, bromo or iodo; $R_2$ is hydrogen, a lower alkyl group, a halogen or cyano group; $R_3$ is a lower alkylene group, i.e., 1–4 carbon alkylene group, or a lower cycloalkylene group, i.e., a 3–6 carbon cycloalkylene group; $R_4$ and $R_5$ each is hydrogen, a lower alkyl group or lower cycloalkyl group, or $R_3$ and/or $R_4$ and/or $R_5$ taken together represent the atoms necessary to complete a 3 to 8 membered heterocyclic ring structure; on a polyhydroxy-substituted polymer. If desired, the graft copolymer may also include a second monomer grafted thereon, i.e., an ethylenically unsaturated monomer. In still another embodiment, the above-described polymer may comprise only a portion of the binder, the remainder constituting gelatin or a second synthetic polymer.

DETAILED DESCRIPTION OF THE INVENTION

As indicated, the present invention is directed to photosensitive silver halide emulsions wherein photosensitive silver halide crystals are disposed in a water-soluble film-forming synthetic polymeric binder comprising a polyhydroxy-substituted polymer having grafted thereon a vinyl aminoalkyl ether monomer represented by the formula set forth above.

Such polymers have been found to substantially satisfy all of the basic requirements for a gelatin substitute, as delineated above. The emulsions of the present invention having polymers with primary and secondary aminogroups are characterized by excellent latent image stability. In addition, the emulsions of the present invention are more stable against degradation than gelatin, particularly against hydrolysis in acidic or basic media of the polymeric backbone and pendent functional groups, by virtue of the carbon-carbon and ether linkages of the instant polymers. These polymers also show a resistance to the growth of microorganisms.

With regard to the backbone polymer of the graft copolymer; in general, any organic polymer comprising repeating units comprising structural units containing a plurality of

groupings capable of being oxidized by, e.g., a transition metal ion catalyst is useful in the present invention. Preferred backbones are substituted or unsubstituted cellulosic or polyvinyl polymers, and most preferably, a backbone selected from the group consisting of polymeric polyols, polyvinyl alcohol, gelatin, polysaccharides, partial acetals of polyvinyl alcohol, etc.

It is believed that upon oxidation of the

grouping, the free radical is formed, which attacks the double bond of the vinyl aminoalkyl ether monomer, thus initiating polymerization.

As examples of such polyhydroxy-substituted polymers, mention may be made of the following:

(1) 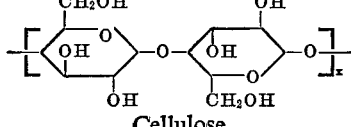
Cellulose (2) 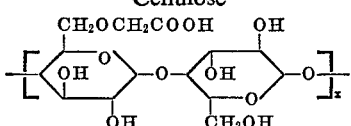
Carboxymethyl cellulose (3) 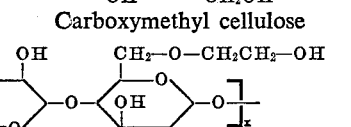
Hydroxyethyl cellulose (4) 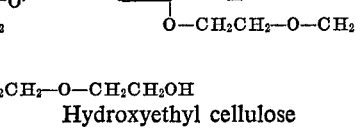
Carboxymethyl hydroxyethyl cellulose (5) 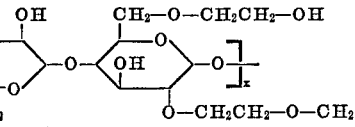
Hydroxypropyl cellulose (6) 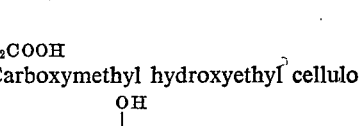
Methylcellulose (7) 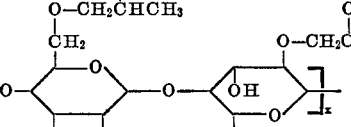
Hydroxypropylmethyl cellulose (8) 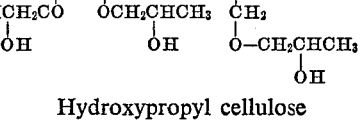
Hydroxybutylmethyl cellulose (9) 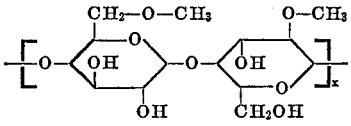
Alginic acid

(10) 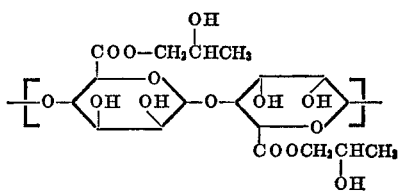
Propyleneglycol alginate

(11) 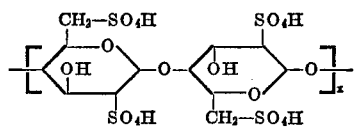
Cellulose sulfate

(12) 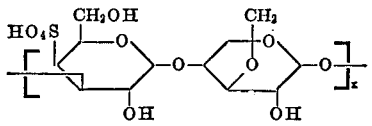
Kappacarrageenan

(13) 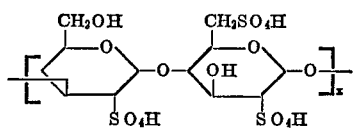
Lambda carrageenan

(14) Soluble starch

(15) Gelatin

(16) 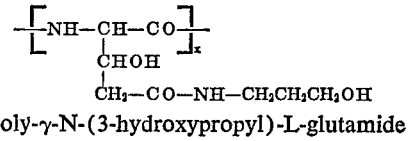
Poly-γ-N-(3-hydroxypropyl)-L-glutamide

(17) 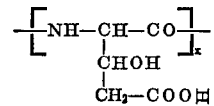
Polyglutamic acid

(18) 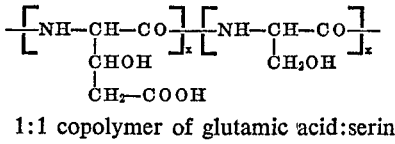
1:1 copolymer of glutamic acid:serine

(19) 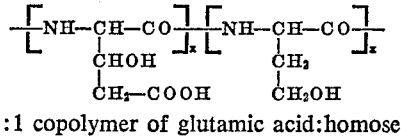
1:1 copolymer of glutamic acid:homoserine

(20) 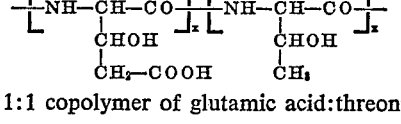
1:1 copolymer of glutamic acid:threonine

(21) 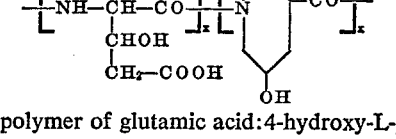
1:1 copolymer of glutamic acid:4-hydroxy-L-proline

(22) 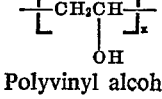
Polyvinyl alcohol

(23) 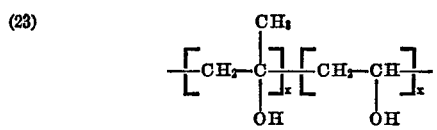
1:1 copolymer of vinyl alcohol:isopropenyl alcohol

(24) 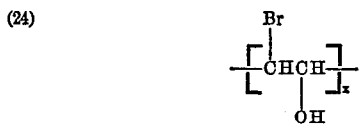
Poly-β-bromovinyl alcohol

(25) 
Poly-β-chlorovinyl alcohol

(26) 
Polypropene-1-ol

(27) 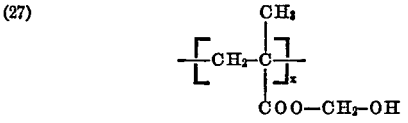
Polyhydroxymethyl methacrylate

(28) 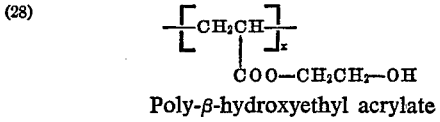
Poly-β-hydroxyethyl acrylate

(29) 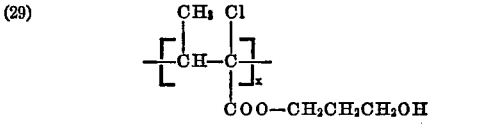
Poly-γ-hydroxypropyl-α-chlorocrotonate

(30) 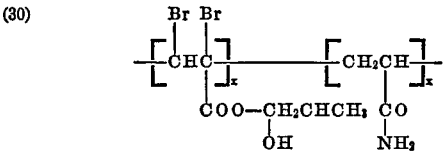
1:1 copolymer of acrylamide:2-hydroxy-n-Poly-N-methylol acrylamide

(31) 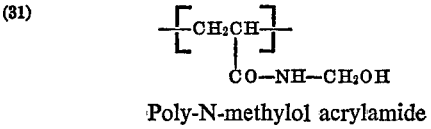
Poly-N-methylol acrylamide

(32) 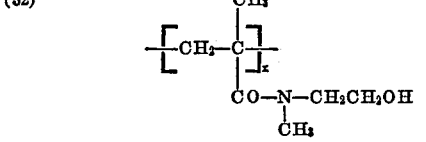
Poly-N-methyl-N-β-hydroxyethyl methacrylamide

(33) 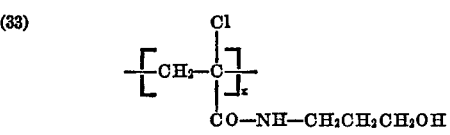
Poly-N[γ-hydroxy-n-propyl]α-chloroacrylamide

(34) 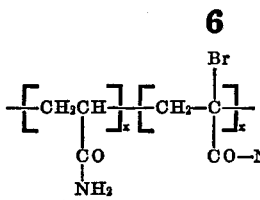
1:1 copolymer of acrylamide:N[β-hydroxy-n-propyl]α-bromoacrylamide

(35) 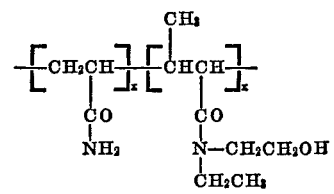
1:1 copolymer of acrylamide:N-ethyl-N-(β-hydroxyethyl)crotonamide

(36) 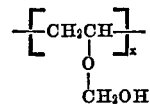
Polyvinyl hydroxymethyl ether

(37) 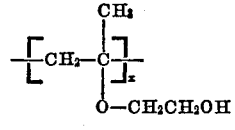
Polyisopropenyl β-hydroxyethyl ether

(38) 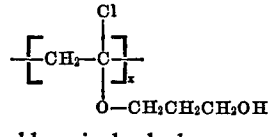
Poly-α-chlorovinyl γ-hydroxypropyl ether

(39) 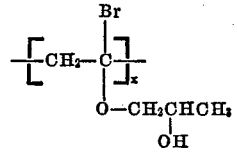
Poly-α-bromovinyl β-hydroxy-n-propyl ether

(40) 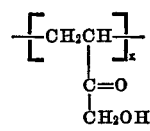
Polyvinyl hydroxymethyl ketone

(41) 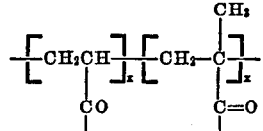
1:1 copolymer of acrylamide:isopropenyl β-hydroxyethyl ketone

(42) 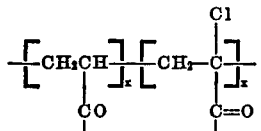
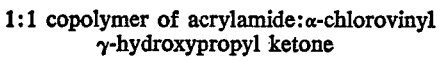
1:1 copolymer of acrylamide:α-chlorovinyl γ-hydroxypropyl ketone

(43) 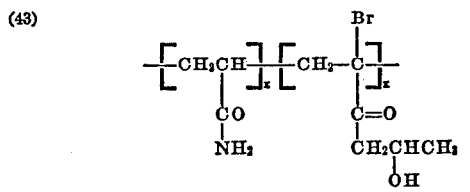

1:1 copolymer of acrylamide:α-bromovinyl β-hydroxy-n-propyl ketone

1:1 copolymer of acrylamide:α-bromovinyl β-hydroxy-n-propyl ketone

(44) 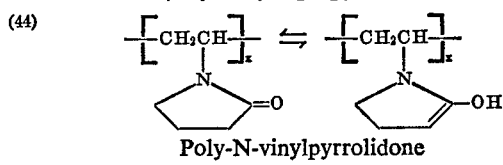

Poly-N-vinylpyrrolidone

Typical examples of monomers contemplated as useful for employment in the instant invention for grafting onto the polyhydroxy-substituted polymer include:

(45) 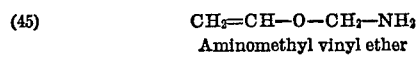
Aminomethyl vinyl ether

(46) 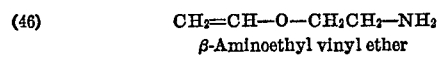
β-Aminoethyl vinyl ether

(47) 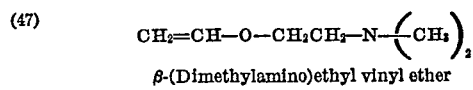
β-(Dimethylamino)ethyl vinyl ether

(48) 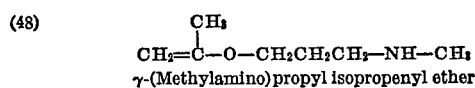
γ-(Methylamino)propyl isopropenyl ether

(49) 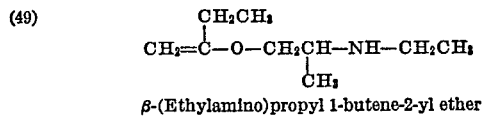
β-(Ethylamino)propyl 1-butene-2-yl ether

(50) 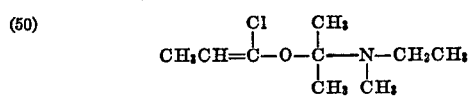
2-(methylethylamino)prop-2-yl 1-chloro-1-propenyl ether

(51) 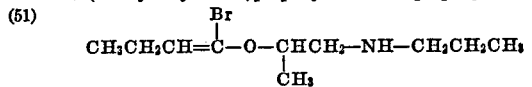
1-(n-propylamino)prop-2-yl 1-bromo-1-butenyl ether

(52) 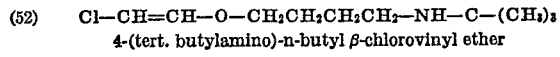
4-(tert. butylamino)-n-butyl β-chlorovinyl ether

(53) 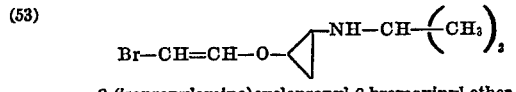
2-(isopropylamino)cyclopropyl β-bromovinyl ether

(54) 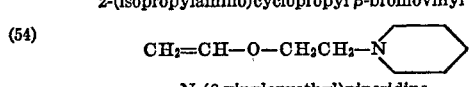
N-(β-vinyloxyethyl)piperidine

(55) 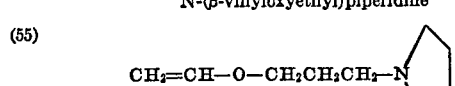
N-(γ-vinyloxypropyl)pyrrolidine

(56) 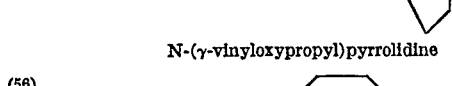
4-vinyloxy-1-methylpiperidine

(57) 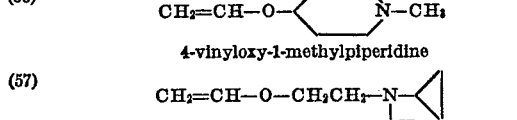
N-[β-vinyloxyethyl]-N-cyclopropyl-N-methylamine

(58) 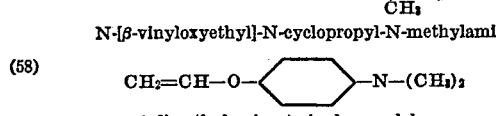
1-dimethylamino-4-vinyloxycyclohexane

(59) 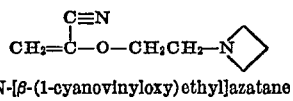
N-[β-(1-cyanovinyloxy)ethyl]azatane

(60) 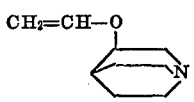
3-vinyloxyquinuclidine

(61) 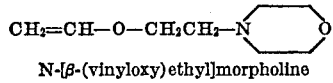
N-[β-(vinyloxy)ethyl]morpholine

The instant graft copolymers may have, in addition to the structures defined above, any compatible repeating unit or various repeating units or additional grafted segments which are not detrimental to photographic silver halide emulsions and which permit the polymers to be soluble in water. Examples of typical comonomers which may be employed include the following ethylenically-unsaturated monomers:

(62) 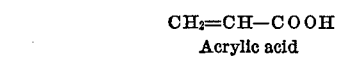
Acrylic acid

(63) 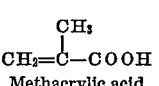
Methacrylic acid

(64) 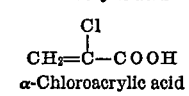
α-Chloroacrylic acid

(65) 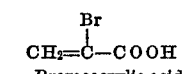
α-Bromoacrylic acid

(66) 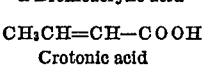
Crotonic acid

(67) 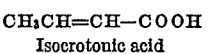
Isocrotonic acid

(68) 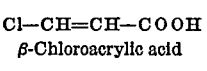
β-Chloroacrylic acid

(69) 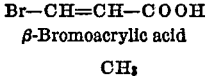
β-Bromoacrylic acid

(70) 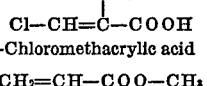
β-Chloromethacrylic acid

(71) 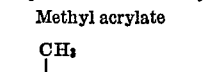
Methyl acrylate

(72) 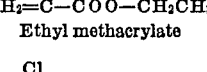
Ethyl methacrylate

(73) 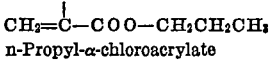
n-Propyl-α-chloroacrylate

(74) 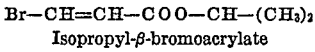
Isopropyl-β-bromoacrylate

(75) 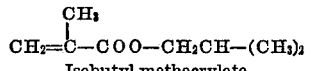
Isobutyl methacrylate

(76) 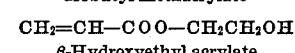
β-Hydroxyethyl acrylate

(77) 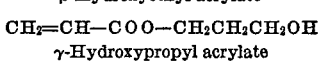
γ-Hydroxypropyl acrylate

(78) 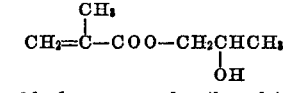
2-hydroxy-n-propyl methacrylate

(79) $CH_2=CH-CO-NH_2$
Acrylamide

(80) $CH_2=\underset{\underset{Cl}{|}}{C}-CO-NH_2$
α-Chloroacrylamide

(81) $CH_2=\underset{\underset{Br}{|}}{C}-CO-NH_2$
α-Bromoacrylamide

(82) $CH_2=\underset{\underset{CH_3}{|}}{C}-CO-NH_2$
Methacrylamide

(83) $CH_2=\underset{\underset{CH_2CH_3}{|}}{C}-CO-NH_2$
α-Ethylacrylamide

(84) $Cl-CH=\underset{\underset{CH_3}{|}}{C}-CO-NH_2$
β-Chloromethacrylamide

(85) $Br-CH=\underset{\underset{Br}{|}}{C}-CO-NH_2$
2,3-dibromoacrylamide

(86) $CH_3CH=CH-CO-NH_2$
Crotonamide

(87) $CH_2=\underset{\underset{CH_3}{|}}{C}-CO-NH-CH_3$
N-methylmethacrylamide

(88) $CH_2=CH-CO-N-(CH_3)_2$
N,N-dimethylacrylamide

(89) $CH_2=\underset{\underset{Cl}{|}}{C}-CO-NH-CH_2CH_3$
N-ethyl-α-chloroacrylamide

(90) $CH_2CH=CO-NH-C-(CH_3)_3$
N-tertiary butylacrylamide

(91) $CH_2=CH-CO-NH-\langle\text{cyclohexyl}\rangle$
N-cyclohexylacrylamide

(92) $CH_2=CH-CO-NH-\underset{\underset{(CH_3)_2}{|}}{C}-CH_2-C-(CH_3)_3$
N-tertiary octyl acrylamide

(93) $CH_2=CH-CO-NH-CH_2OH$
N-methylolacrylamide

(94) $CH_2=CH-CO-NH-CH_2CH_2OH$
N-(β-hydroxyethyl) acrylamide

(95) $CH_2=CH-CO-NH-\underset{\underset{(CH_3)_2}{|}}{C}-CH_2-\overset{\overset{O}{\|}}{C}-CH_3$
Diacetone acrylamide

(96) $CH_2=CH-CO-NH-CH-(CH_3)_2$
N-isopropylacrylamide

(97) $CH_2=CH-CO-NH-CH_2-\langle\text{phenyl}\rangle$
N-benzylacrylamide

(98) $CH_2=CH-O-CH_3$
Methylvinyl ether

(99) $CH_2=\underset{\underset{Cl}{|}}{C}-O-CH_2CH_3$
Ethyl α-chlorovinyl ether (100) $CH_2=CH-O-CH_2CH_2Cl$
β-Chloroethyl vinyl ether (101) $CH_2=CH-O-CH_2CH_2-OCH_3$
β-Methoxyethyl vinyl ether (102) $CH_2=\underset{\underset{CH_3}{|}}{C}-O-CH_2CH-(CH_3)_2$
Isobutyl isopropenyl ether (103) $CH_2=CH-O-CH_2CH_2CH_2CH_2CH_2-CH-(CH_3)_2$
Isooctyl vinyl ether (104) $CH_2=CH-\overset{\overset{O}{\|}}{C}-CH_3$
Methylvinyl ketone (105) $CH_2=\underset{\underset{CH_3}{|}}{C}-\overset{\overset{O}{\|}}{C}-CH_2CH_3$
Ethyl isopropenyl ketone (106) $CH_2=\underset{\underset{Cl}{|}}{C}-\overset{\overset{O}{\|}}{C}-CH_2CH_2CH_3$
n-Propyl-α-chlorovinyl ketone (107) $CH_2=\underset{\underset{Br}{|}}{C}-\overset{\overset{O}{\|}}{C}-CH_2CH_2-O-CH_3$
β-Methoxyethyl-α-bromovinyl ketone (108) $CH_2=\underset{\underset{CH_2CH_3}{|}}{C}-\underset{\underset{O}{\|}}{C}-CH_2CH_2OH$
β-Hydroxyethyl-1-butene-2-yl ketone (109) $CH_2=CH-CHO$
Acrolein (110) $CH_3-CH=CH-CHO$
Crotonaldehyde (111) $CH_2=\underset{\underset{Cl}{|}}{C}-CHO$
α-Chloroacrolein (112) $CH_2=\underset{\underset{Br}{|}}{C}-CHO$
α-Bromoacrolein (113) $CH_2=CH-C≡N$
Acrylonitrile (114) $CH_3CH=CH-C≡N$
Crotononitrile (115) $CH_2=\underset{\underset{Cl}{|}}{C}-C≡N$
α-Chloroacrylonitrile (116) $CH_2=\underset{\underset{Br}{|}}{C}-C≡N$
α-Bromoacrylonitrile (117) $BrCH=\underset{\underset{CH_3}{|}}{C}-C≡N$
β-Bromomethacrylonitrile (118) $ClCH=\underset{\underset{CH_2CH_3}{|}}{C}-C≡N$
β-Chloroethacrylonitrile (119) $CH_2=\underset{\underset{C≡N}{|}}{C}-COO-CH_3$
Methyl α-cyanoacrylate (120) $CH_2=CH-CO-NH-CH_2-CO-NH_2$
Acrylamidoacetamide (121) $CH_2=\underset{\underset{CH_3}{|}}{C}-CO-NH-CH_2-CO-NH_2$
Methacrylamidoacetamide (122) $CH_3CH=CH-CO-NH-\underset{\underset{CH_3}{|}}{CH}-CO-NH-CH_3$
2-crotonamido-N-methylpropionamide (123) $CH_2=CH-CO-NH-\underset{\underset{CH_3}{|}}{CH}-CO-NH_2$
2-acrylamidopropionamide (124) CH₂=C—CO—NH—CH—CO—NH₂
          |           |
          CH₃         CH₃
2-methacrylamidopropionamide (125) CH₂=C—CO—NH—CH—CO—NH₂
          |           |
          Cl          CH
                      |
                      (CH₃)₂
2-(α-chloroacrylamido)-3-methylbutyramide (126) CH₂=CH—CO—NH—CH₂—NH—CO—CH₃
N-(acetamidomethyl)acrylamide (127) CH₂=C—CO—NH—CH₂—NH—CO—CH₂CH₃
          |
          CH₃
N-(propionamidomethyl)methacrylamide (128)     Cl
          |
CH₂=C—CO—NH—CH₂—NH—CO—CH₂CH₂CH₃
N-(n-butyramidomethyl)α-chloroacrylamide (129) Maleic anhydride (130) HOOC—CH=CH—COOH
Maleic acid (131) HOOC—CH=CH—CO—NH₂
Maleic acid amide (132) HOOC—CH=CH—CO—NH—CH₂CH₃
N-ethylmaleic acid amide (133) CH₃—OOC—CH=CH—CO—NH—CH₃
N-methyl methylmaleate amide (134) CH₂=CH—OOCH
Vinyl formate (135) CH₂=CH—OOC—CH₃
Vinyl acetate (136) CH₂=CH—OH
Vinyl alcohol (obtained by hydrolysis of copolymerized vinyl acetate)

(137) CH₂=C—OOC—CH₂Br
          |
          CH₃
Isopropenyl bromoacetate (138) CH₂=CH—OOC—C—(CH₃)₃
Vinyl pivalate (139) CH₂=CH—NH—COO—C—(CH₃)₃
N-vinyl-tertiary butylcarbamate (140) CH₂=C—CH₂—COO—CH₂CH₃
          |
          COOH
Ethyl-3-carboxy-3-butenate (141) CH₂=CH—⟨furan⟩
α-Vinylfuran (142) CH₂=CH—COO—CH₂—⟨tetrahydrofuran⟩
α-(Acryloyloxymethyl)-tetrahydrofuran (143) CH₂=CH—⟨⟩—OH
p-Hydroxystyrene (144) CH₂=CH—⟨⟩
              |
              OH
m-Hydroxystyrene (145) CH₂=CH—⟨⟩
              |
              OH
o-Hydroxystyrene (146) CH₂=CH—⟨⟩—COOH
p-Carboxystyrene (147) CH₂=CH—⟨⟩
              |
              COOH
m-Carboxystyrene (148) CH₂=CH—⟨⟩
              |
              COOH
o-Carboxystyrene Polymerization of the indicated monomers in achieved by conventional transition metal ion catalyst techniques.

The following nonlimiting example illustrates the preparation of polymers within the scope of the present invention:

Graft of N-(β-vinyloxyethyl)piperidine onto poly N-vinylpyrrolidone

| Reactants | Molecular weight | Moles | Quantity used— |
|---|---|---|---|
| 10%, by weight, aqueous (distilled H₂O) solution of poly N-vinylpyrrolidone (PVP K-90 available from General Aniline and Film) | 111.14 | 0.05 | 55.57 g. |
| N-(β-vinyloxyethyl)piperidine | 155.23 | 0.05 | 7.76 g. |
| Concentrated nitric acid | | | 108 drops. |
| Ceric ammonium nitrate | | | 0.56 g. |
| 11.2%, by weight, solution of KOH | | | 20 ml. |

Procedure.—55.57 g. of the poly N-vinylpyrrolidone solution was added to a 150 ml. beaker containing a magnetic stirrer. With stirring, 7.76 g. of N-(β-vinyloxyethyl)piperidine was added and the mixture was deaerated with nitrogen for thirty minutes. Under a N₂ blanket, concentrated nitric acid was added dropwise until the solution reached pH 4.0 (which was 108 drops).

Then, 0.56 g. of ceric ammonium nitrate dissolved in 5 ml. of distilled H₂O was added, resulting in a solution pH of 1.8. The solution was stirred for three hours under the N₂ blanket. During this time, the ordor of acetaldehyde was deteced and the yellow color of the ceric ion faded. The solution was then adjusted to pH 9 with 20 mls. of the 11.2% ROH solution, added dropwise. This solution was subsequently dialyzed against distilled water for five days. Analysis showed a 1:1 graft of N-(β-vinyloxyethyl)piperidine on poly N-vinylpyrrolidone.

The following general procedure may be used for preparing photographic emulsions using the graft copolymers of the instant invention as the colloid binders.

A water-soluble silver salt, such as silver nitrate, may be reacted with at least one-water-soluble halide, such as potassium, sodium, or ammonium bromide, preferably together with potassium, sodium or ammonium iodide, in an aqueous solution of the above-described polymer. The emulsion of silver halide thus formed contains water-soluble salts, as a by-product of the double decomposition in addition to any unreacted excess of the initial salts. To remove these soluble materials, the emulsion may be centrifuged and washed with distilled water to a low conductance. The emulsion may then be redispersed in distilled water. To an aliquot of this emulsion may be added a known quantity of a solution of bodying or thickening polymer, such as polyvinyl alcohol having an average molecular weight of about 100,000 (commercially available from E. I. du Pont de Nemours & Company, Wilmington, Del., designated Type 72-60). A surfactant, such as dioctyl ester of sodium sulfosuccinic acid, designated Aerosol OT (commercially available from American Cyanamid Company, New York, N.Y.), may be added and the emulsion coated onto a film base of cellulose triacetate sheet having a coating of hardened gelatin.

Alternatively, the soluble salts may be removed by adding to the emulsion a solution of polyacid such as 1:1 ethylene:maleic acid copolymer and lowering the pH to below 5, thereby bringing about precipitation of the polyacid carrying the silver halide grains along with the precipitate, and then to wash and resuspend the resulting precipitate by redissolving the polyacid at pH 6 to 7.

The emulsions may be chemically sensitized with sulfur compounds such as sodium thiosulfate or thiourea, with reducing substances such as stannous chloride; with salts of noble metals such as gold, rhodium and platinum; with amines and polyamines; with quaternary ammonium compounds such as alkyl α-picolinium bromide; and with polyethylene glycols and derivatives thereof.

The graft copolymers employed as the binders in the emulsions of the present invention may be cross-linked according to conventional procedures. As an example, polymers containing amine groups may be cross-linked with zirconium salts under alkaline conditions. Cross-linking agents conventionally employed with hydroxyl-containing polymers, such as boric acid, may also be employed.

The emulsions of the present invention may also be optically sensitized with cyanine and merocyanine dyes more easily than the gelatin emulsions. Where desired suitable antifoggants, toners, restrainers, developers, accelerators, preservatives, coating aids, plasticizers, hardeners and/or stabilizers may be included in the composition of the emulsion.

The emulsions of this invention may be coated and processed according to conventional procedures of the art. They may be coated, for example, onto various types of rigid or flexible supports, such as glass, paper, metal, and polymeric films of both the synthetic type and those derived from naturally occurring products. As examples of specific materials which may serve as supports, mention may be made of paper, aluminum, polymethacrylic acid, methyl and ethyl esters, vinylchloride polymers, polyvinyl acetal, polyamides such as nylon, polyesters such as polymeric film derived from ethylene glycol-terephthalic acid, and cellulose derivatives such as cellulose acetate, triacetate, nitrate, propionate, butyrate, acetate propionate, and acetate butyrate. Suitable subcoats may be provided on the supports, for example, a layer of gelatin, if necessary or desirable for adherence, as is well known in the art.

The polymers employed in the practice of the instant invention may contain about 5 to 75 mole percent of the grafted monomer, preferably about 20 mole percent. The specific amount employed may be selected by the operator depending upon the grain particle size and habit desired. For example, the grain size distribution of the emulsion may be varied by changing the mole ratio and type of monomer grafted on the hydroxyl-containing polymer backbone.

By selecting appropriate monomers to be grafted on the hydroxyl-containing polymers, the instant graft polymers may be made to be compatible with all water-soluble bodying polymers. Emulsions made from these novel polymers, may be bodied with any water-soluble polymers, overcoming the disadvantage encountered with gelatin which is only compatible with a very few polymers in a most limited pH range. As examples of specific materials which may serve as bodying polymers are polyvinyl alcohol, polyacrylamide, polyalkylacrylamides, polyvinyl pyrrolidone, poly (β-hydroxyethyl acrylate), polyethylene imine and cellulose derivatives such as hydroxypropyl cellulose and methyl cellulose. It has been found that using only a small amount of one or more of the instant polymers, large amounts of photosensitive silver halide grains may be obtained.

An emulsion made from one of these polymers of the instant invention may therefore be bodied with a water-soluble polymer such that the polymeric constitution of the resulting emulsion comprises a relatively large percentage of the bodying polymer.

By selecting appropriate comonomers, copolymers with selected diffusion charactertistics may be prepared. For example, the rate of diffusion of alkali ion or a dye developer through an emulsion comprising one of the polymers of this invention may be modified by changing the polymer composition.

The instant polymers containing acidic comonomers may be pH flocculated in order to remove the soluble salts formed as a byproduct of the double decomposition reaction between the water-soluble silver salt and the water-soluble halide, in addition to any unreacted excess of the initial salts. As an example, an acid copolymer may be precipitated by lowering the pH below 5 and then washed and resuspended by raising the pH to above 7.

The instant invention will be further illustrated by reference to the following nonlimiting example in which the preparation of the emulsion was carried out in the following manner:

A solution of 4.15 g. of the dry graft copolymer of β-vinyloxyethylpipeindine on poly N-vinylpyrrolidone as prepared in the example above in 266 ml. of distilled water was adjusted to pH 3.0 with dilute nitric acid and maintained at a temperature of 55° C. To this solution, 88.0 g. of dry potassium bromide and 1.0 g. of dry potassium iodide were added.

A solution of 55 g. of silver nitrate in 500 ml. of distilled water was prepared. From this silver nitrate solution, 100 ml. was rapidly added with continuous agitation to the polymer-halide solution and the remainder was added over a period of 22 minutes. Thereafter, the emulsion was ripened for 60 minutes at 55° C., and then rapidly cooled to below 20° C.

The resultant emulsion exhibited good suspension stability and contained many crystals of octahedral shape. The diameters of these crystals ranged from 0.3 to 1.4 microns, with a diameter of about 0.5 micron. A control emulsion prepared by the same procedure but employing gelatin as the binder provided crystals having diameters ranging from 0.2 to 1.8 microns, with an average of about 1.0 micron.

In certain photographic applications, it may be desirable to replace part, but not all, of the gelatin in the photosensitive emulsion. In view of the characteristics of these polymers described above, and further, in view of their compatability with gelatin in substantially all proportions, it will be obvious that these polymers are ideally suited for such use.

The term "photosensitive" and other terms of similar import are herein employed in the generic sense to describe materials possessing physical and chemical properties which enable them to form usable images when photoexposed by radiation actinic to silver halide.

Since certain changes may be made in the above products and processes without departing from the scope of the invention herein involved, it is intended that all matter contained in the above description shall be interpreted as illustrative only and not in a limiting sense.

What is claimed is:

1. A photosensitive silver halide emulsion wherein the emulsion binder comprises a water-soluble film-forming graft copolymer of a polyhydroxy-substituted polymer and a vinyl aminoalkyl ether monomer of the formula:

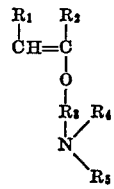

wherein $R_1$ is hydrogen, a lower alkyl group or a halogen; $R_2$ is hydrogen, a lower alkyl group, a halogen or cyano group; $R_3$ is a lower alkylene or lower cycloalkylene group; $R_4$ and $R_5$ each is hydrogen, a lower alkyl group or a lower cycloalkyl group, or $R_3$ and/or $R_4$ and/or $R_5$ taken together represent the atoms necessary to complete a 3 to 8-membered heterocyclic ring structure.

2. The product as defined in claim 1 wherein substantially all of said emulsion binder comprises said graft copolymer.

3. The product as defined in claim 1 wherein said graft copolymer comprises 5-75 mole percent of said vinyl aminoalkyl ether.

4. The product as defined in claim 1 wherein said silver halide emulsion is a silver iodobromide emulsion.

5. The product as defined in claim 1 wherein said emulsion includes at least one chemical sensitizing agent.

6. The product as defined in claim 1 wherein said emulsion includes at least one optical sensitizing agent.

7. The product as defined in claim 1 wherein said vinyl aminoalkyl ether is N-($\beta$-vinyloxyethyl) piperidine.

8. The product as defined in claim 7 wherein said polyhydroxy-substituted polymer is poly N-vinylpyrrolidone.

9. The product as defined in claim 1 wherein said graft copolymer includes a second ethylenically unsaturated monomer.

10. The product as defined in claim 9 wherein said second monomer is acrylamide.

11. The product as definen in claim 9 wherein said second monomer is ethyl acrylamide.

12. The product as defined in claim 1 wherein said emulsion includes a bodying polymer.

13. The product as defined in claim 12 wherein said bodying polymer is gelatin.

14. The product as defined in claim 12 wherein said bodying polymer is polyvinyl alcohol.

15. The product as defined in claim 12 wherein said bodying polymer is hydroxyethyl cellulose.

16. A method of preparing a photosensitive silver halide emulsion which comprises reacting a water-soluble silver salt with a water-soluble halide salt in an aqueous solution containing a water-soluble film-forming graft copolymer of a polyhydroxy-substituted polymer and a vinyl aminoalkyl ether monomer of the formula:

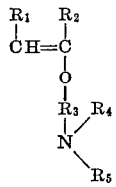

wherein $R_1$ is hydrogen, a lower alkyl group or a halogen; $R_2$ is hydrogen, a lower alkyl group, a halogen or cyano group; $R_3$ is a lower alkylene or lower cycloalkylene group; $R_4$ and $R_5$ each is a lower alkyl group or a lower cycloalkyl group or $R_3$ and/or $R_4$ and/or $R_5$ taken together represent the atoms necssary to complete a 3 to 8-membered heterocyclic ring structure.

17. The method as defined in claim 18 wherein said vinyl aminoalkyl ether is N-($\beta$-vinyloxyethyl) piperidine.

18. The method as defined in claim 16 wherein said polyhydroxy-substituted polymer is poly N-vinylpyrrolidone.

19. The method as defined in claim 16 wherein said graft copolymer includes a second ethylenically unsaturated monomer.

20. The method as defined in claim 19 wherein said second monomer is acrylamide.

21. The method as defined in claim 19 wherein said second monomer is ethyl acrylamide.

References Cited
UNITED STATES PATENTS

| | | | |
|---|---|---|---|
| 3,681,079 | 8/1972 | Fitzgerald | 96—114 |
| 3,425,836 | 2/1969 | Perry et al. | 96—114 |
| 2,829,053 | 4/1958 | Weaver | 96—114 |
| 3,345,346 | 10/1967 | Reynolds | 96—114 |

RONALD H. SMITH, Primary Examiner

U.S. Cl. X.R.

96—114